Patented Jan. 13, 1953

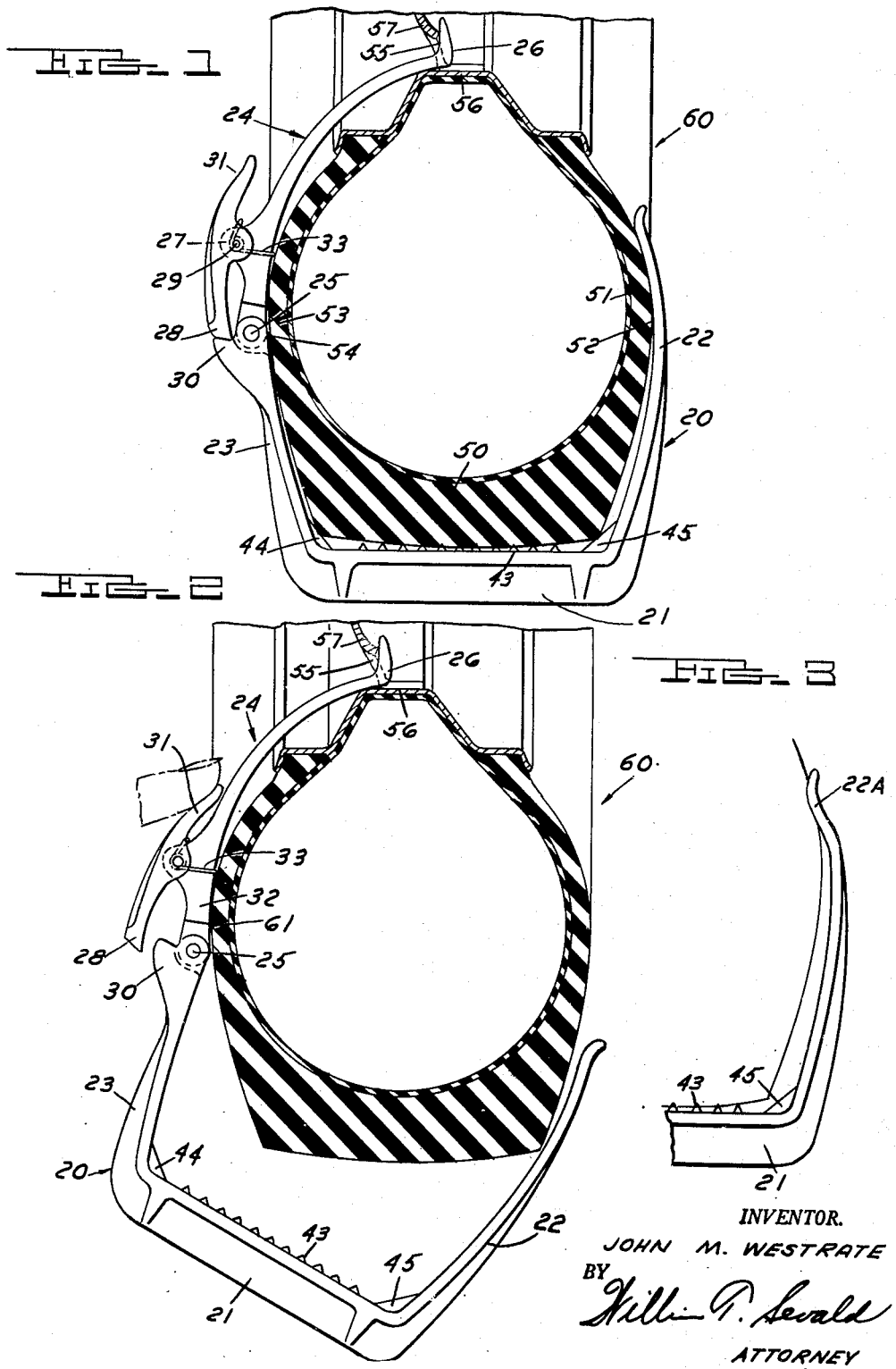

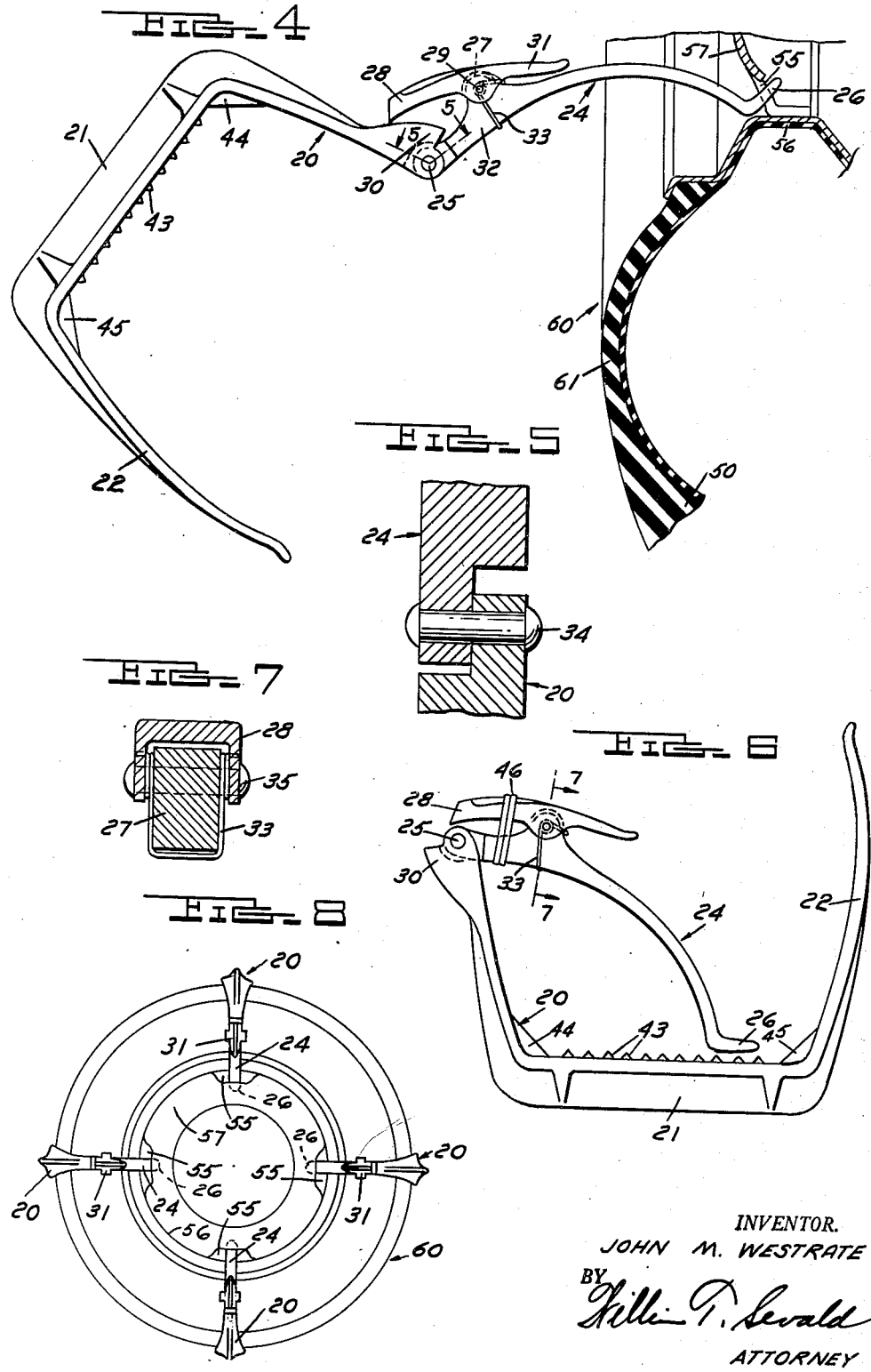

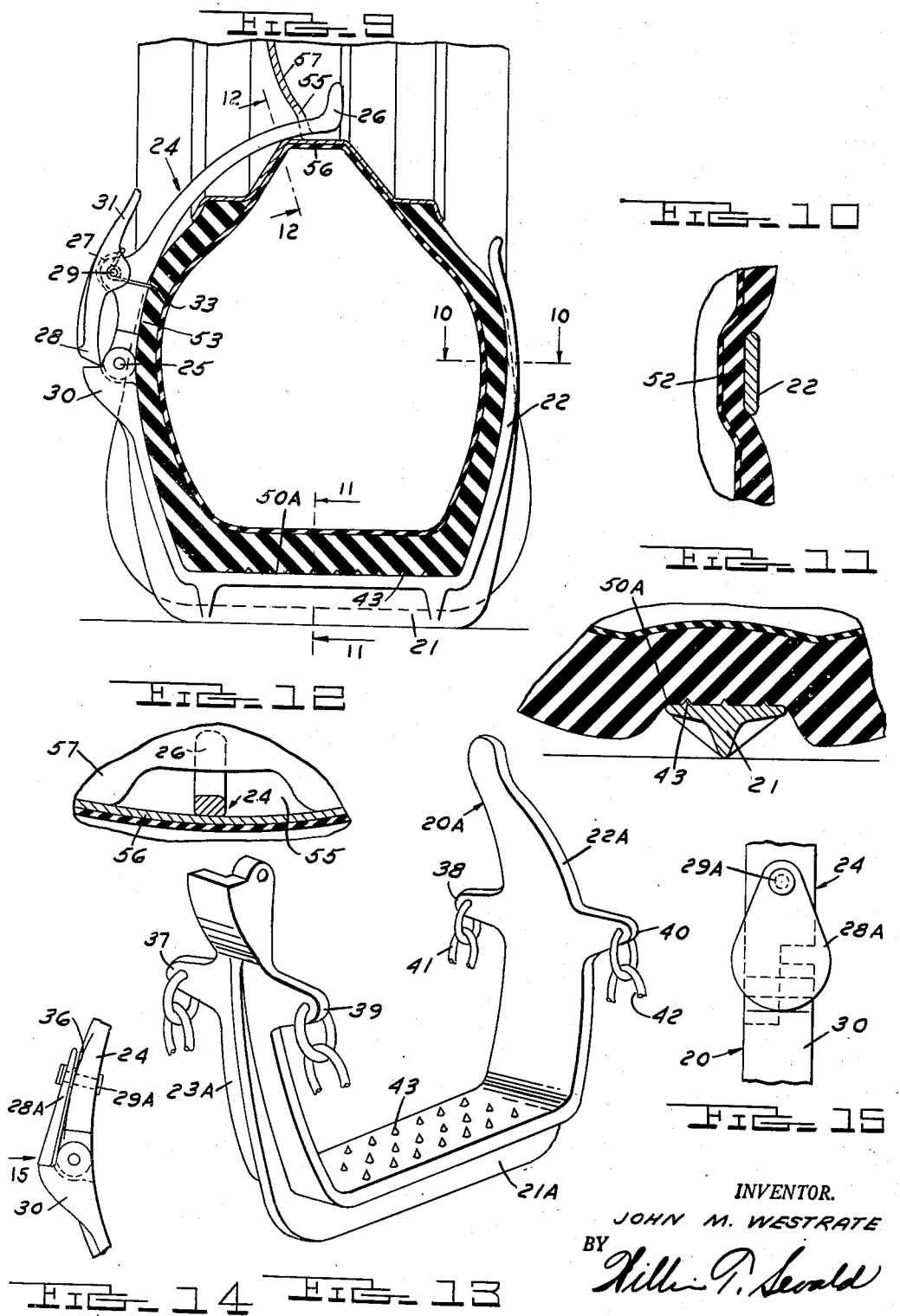

2,625,194

UNITED STATES PATENT OFFICE 2,625,194

TRACTION DEVICE

John M. Westrate, Pleasant Ridge, Mich.

Application May 26, 1952, Serial No. 289,994

16 Claims. (Cl. 152—228)

This invention relates to traction devices, in particular it relates to a quick attaching and detaching cleat particularly suitable for automobile wheels.

Traction cleats, lugs, and chains have been employed heretofore to augment the traction of a wheel, however, the several devices of the prior art have not proven entirely satisfactory inasmuch as they are complicated in design and construction, expensive to manufacture, difficult to mount and dismount, and/or improperly engineered so that they become detached or damaged in use.

With the foregoing in view, the primary object of the invention is to provide a wheel cleat, lug, or anti-skid element which is simple in design and construction, inexpensive to manufacture, easy to mount and dismount, and which has structural aspects which eliminate the attaching means from being damaged in use and/or the wheel being damaged.

An object of the invention is to provide a traction cleat which can be easily and economically manufactured as by casting, forging, and stamping as the component parts are easily made and the assembly of the parts readily accomplished.

An object of the invention is to provide a traction cleat which is easily mountable and dismountable on a wheel from a position on the outside of the wheel.

An object of the invention is to provide a traction cleat which has an anchor arm adapted to co-act with an aperture or the so-called chain-slot of a disc wheel for attaching the cleat to the wheel assembly.

An object of the invention is to provide a traction cleat which does not require the applicator placing his hands in the area of the tread or in the area behind the wheel.

An object of the invention is to provide a C-shaped traction cleat adapted to lie across the tread of a tire and adapted to partially extend radially inwardly from a tire tread area partially over a tire side wall area on either side thereof.

An object of the invention is to provide an anchor link or bar having one end initially insertable in the chain apertures of a wheel which is subsequently inextricably lockable therein.

An object of the invention is to provide an anchor link or bar which is pivotally connected to the traction cleat.

An object of the invention is to provide an anchor link which has a rounded wheel attaching neck and end so that the link can twist in the wheel aperture without damage.

An object of the invention is to provide a boss on the traction cleat and a boss on the anchor link which co-act together to prohibit the traction cleat from detachably pivoting relative to the anchor link to maintain the traction cleat locked in position.

An object of the invention is to provide a dog which is manually movable from engaging relationship with the other dog so as to permit pivoting or hinging the traction cleat relative to the anchor strip for mounting and dismounting the device relative to a wheel.

An object of the invention is to so mount the movable dog so that the centrifugal force generated by the wheel in turning tends to urge the movable dog into locking engagement or relationship with the other dog.

An object of the invention is to provide a movable dog which co-acts with centrifugal force generated by a turning wheel to urge the movable dog into locking position.

An object of the invention is to provide a projection upon the anchor link which extends outwardly beyond pivotal connection between the anchor strap and the traction cleat so that a movable dog pivotally mounted on the projection is integrated in triangulating relationship relative to the anchor link and traction cleat so that outward pivotal movement of the traction cleat relative to the anchor strap is prevented by a movable dog in its triangulating disposition so as to tend to force the dog into engagement.

An object of the invention is to provide a projection on the anchor link so to place the movable dog pivot point that it is located in a plane outside or beyond the pivotal connection between the anchor link and the traction cleat so that in inward movement of the anchor link relative to the traction cleat, the pivotal connection of the movable dog does not move out of triangulating relationship relative to the anchor link and traction cleat.

An object of the invention is to provide a pivotal connection between the traction cleat and the anchor link which, when mounted, is free to pivot inwardly and prohibited from pivoting outwardly.

An object of the invention is to provide a movable dog which locks automatically upon locating the device in the proper mounted relationship on a wheel.

These and other objects of the invention will become apparent by reference to the following description of an easily mountable, dismountable, and lockable traction cleat embodying the invention taken in connection with the accompanying drawings, in which:

Fig. 1 is a side elevational view of the device in locked condition to a wheel and tire showing the wheel components in cross-section.

Fig. 2 is a view similar to Fig. 1 showing the device being mounted on or removed from a tired wheel.

Fig. 3 is a partial side elevational view of the interior arm of the inventive traction cleat showing a modified sharply indented end adapted to engage the tire radially inwardly of the apex of the curve of the tire side wall under load bearing conditions.

Fig. 4 is a side elevational view of the device in cocked relationship for attaching and detaching the device relative to a wheel.

Fig. 5 is a cross-sectional view of the pivotal or hinge connection between the traction cleat and anchor link taken on the line 5—5 of Fig. 4.

Fig. 6 is a side elevational view of the device cocked inwardly such as for shipping and storage.

Fig. 7 is a cross-sectional view of Fig. 6 taken on the line 7—7 thereof showing the pivotal connection between the movable dog and anchor link projection.

Fig. 8 is a face elevational view of a wheel having four inventive devices disposed thereon.

Fig. 9 is a view similar to Fig. 1 showing the device in load bearing relationship to the wheel and tire.

Fig. 10 is a cross-sectional view of Fig. 9 taken on the line 10—10 thereof.

Fig. 11 is a cross-sectional view of Fig. 9 taken on the line 11—11 thereof.

Fig. 12 is a cross-sectional view of Fig. 9 taken on the line 12—12 thereof.

Fig. 13 is a perspective view of the C-shaped cleat portion showing a modification, including paired cross arms having paired chains disposed therebetween.

Fig. 14 is a partial side elevational view of a modified movable dog; and

Fig. 15 is a face elevational view of Fig. 13 taken on the line 14—14 thereof.

Referring now to the drawing wherein like numerals refer to like and corresponding parts throughout the several views, the auxiliary traction device disclosed therein to illustrate the invention comprises a C-shaped traction cleat 20 having a surface engaging lug portion 21 adapted to lie crosswise of a tire tread 50, an inside arm 22 adapted to extend radially inwardly from the lug portion 21 to a point on the side wall 51 of a tire past the apex 52 of the curve in the side wall 51 and preferably formed with a sharply inwardly extending end 22A for clamping to the tire when under load as hereinafter more fully explained, and an exterior radially inwardly extending arm 23 adapted to terminate relative to the outside side wall 53 of a tire adjacent the apex 54 of the curve therein, an anchor link or bar 24 pivotally mounted as at 25 with the cleat 20 and having a sharply angulated end 26 adapted to lie in the wheel aperture 55 and to bear against and interlock with the wheel rim 56 and wheel disc 57. The anchor link or bar 24 is provided with a projection 27 which extends outwardly beyond the pivotal connection 25 so as to triangulate the movable dog 28 pivotally mounted thereon as at 29 relative to the anchor link or bar 24 and the cleat arm 23 and a fixed dog 30 on the cleat arm 23 adapted to engage the movable dog 28 so as to prevent the cleat 30 hinging or pivoting outwardly of the tire and wheel and to maintain the attaching end 26 of the anchor bar 24 in locking relationship relative to the wheel rim 56 and the wheel disc 57 which arrangement is advantageously affected by centrifugal force generated by a turning wheel upon which the device is mounted.

In a modified locking arrangement, Figs. 14 and 15, the dog 28A is pivotally mounted directly on the link 24 and is so integrated that the locking relationship between the dogs 28A and 30 is advantageously affected by centrifugal force.

To remove the inventive device from the wheel assembly 60 as seen in Fig. 1, the user presses the top lever portion 31 of the movable dog 28 inwardly against the locking link 24 thereby moving the dog portion 28 on the opposite side of the pivot 29 out of engagement with the fixed dog 30, Fig. 2, thereby permitting the cleat portion 20 to pivot at 25 so that the cleat portion 20 can be swung out of engagement and gripping relationship with the tire. The locking end 26 of the anchor bar 24 is then removed out of the wheel aperture 55 as seen in Fig. 4. In the device of Figs. 14 and 15 the dog 28A is pivoted at 29A out of engagement with the dog 30.

To mount the inventive device on a wheel assembly 60 the user cocks the anchor link 24 and cleat 20 backwardly as seen in Fig. 4 with the dogs 28 or 28A and 30 out of engagement; he then inserts the locking end 26 of the anchor link 24 in the wheel aperture 55 and moves the device so cocked down on the wheel so as to place the bottom end 32 of the anchor link 24 against the side wall 61 of the tire such as seen in Fig. 2; he then swings the traction cleat 20 on the pivot 25 relative to the anchor link 24 from the position seen in Fig. 4 through the position seen in Fig. 2 to the position seen in Fig. 1 whereupon the spring 33 automatically moves the dog 28 in engaging relationship with the dog 30. In the device of Figs. 14 and 15 the user manually engages the dogs 28A and 30.

The pivotal connection 25 is preferably a strong hinge connection as seen in Fig. 5 secured by a forged rivet 34; the pivotal connection 29 between the movable dog 28 and the projection 27 is preferably a strong hinge connection, such as seen in Fig. 7, secured by a strong rivet 35. Obviously, as many inventive devices can be mounted on the wheel assembly 60 as desired such as seen in Fig. 8 wherein four auxiliary traction devices are mounted locked in the four available wheel apertures 55. The device can be collapsed with the anchor link 24 inside the traction cleat 20 as seen in Fig. 6 to facilitate packaging, shipping, and storage.

Figs. 13 and 14 show a modified movable dog 28A pivotally mounted as at 29A directly on the anchor strap 24 movable into and out of engaging relationship with the fixed dog 30 on the traction cleat 20. It is to be noted that a spring washer 36 is disposed between the movable dog 28A and the anchor arm 24 so that the movable dog 28A is spring pressed in adjusted position to prevent inadvertent disengagement between the dog 28A and the dog 30. A detent, not shown, is preferably disposed between the parts to assist maintaining the locked relationship.

It is to be particularly noted that the centrifugal force generated by the rotation of the wheel assembly 60 when equipped with the inventive device tends to urge the dogs 28 and 28A radially outwardly, and, therefore, into engagement with the dog 30. It is also to be particularly noted that centrifugal force generated by rotation of the wheel assembly 60 tends to urge the dogs 28 and 28A axially inwardly below the pivot point 29 so as to position the dogs 28 and 28A in engaging relationship with the dog 30.

Fig. 13 illustrates a desirable modification in the invention wherein the traction cleat 20A is equipped with paired arms 37, 38, 39, and 40 on the traction cleat arms 22A and 23A so that paired chains 41 and 42 can be disposed between the arms 37 and 48 respectively and the paired arms 39 and 40 respectively. The lug portion 21 and 21A is preferably equipped with tire tread engaging studs 43 to eliminate slipping between the tire tread 50 and the lug portion 21 so as to aid in maintaining the device in adjusted position relative to the wheel.

Fig. 2 illustrates modified tread engaging elements 44 and 45 which are ribs triangulating the juncture of the arms 22 and 23 respectively with the lug portion 21 and are adapted to fit in the side serrations of the tread 50.

Referring to Fig. 6, it is to be noted that a rubber band 46 is tensioned around the anchor link 24 and movable dog 28 urging them together so as to project the dogs in engaged relationship. This feature is illustrated due to the fact that spring steel, such as in the spring 33 and spring washer 36, is conducive to rusting so that the springs will eventually break. Obviously, the modified dog 28A of Figs. 14 and 15 can also be located by use of a rubber band in the event of deterioration in the spring washer 36 by running the rubber band down from the anchor link 24 over the dog 28A and lower end of the anchor link 24. The substitution of a rubber band 46 for the spring 33 does not detract from the automatic locking aspects of the spring pressed dog 28.

In use, Figs. 9, 10, and 11, when the traction lug portion is disposed between the pivot point of the wheel and the ground, the area of the tire at this point is expanded sidewise and narrowed radially. The sidewise expansion of the tire causes the side walls and tread area to overlap the arms 22 and 23 and lug portion 21 respectively so that they are in pressure engagement and interlocking relationship with the tire. Due to the fact the radial extent to the tire is narrowed, the distance between the wheel aperture 55 and the peripheral extent to the tread 50A is shortened, as seen in Fig. 9 over that seen in Fig. 1, and this shortening of distance is absorbed by the inventive device by the anchor arm 24 pivoting inwardly at the pivot point 25 and sliding inwardly of the wheel through the aperture 55 thereby relieving both the wheel and the inventive device from breaking and bending forces which otherwise would be thrust against the disc 57 of the wheel and against the inventive device in the area of the end 26 on the anchor arm 24. This is a very important element of the invention. It is obvious, of course, that upon the inventive device moving out from below the center of the pivot point of the wheel the tire will assume its normal inflated configuration and the end 26 will again engage the wheel disc 57 to secure the device of the wheel as it rotates over the top of the axle.

The inventive traction device with the described features constitutes a compact, durable, neat, and fool-proof mechanism easily operated to attach and detach from the wheel and resiliently coordinated to cooperate with tire dimensional change under the load of the vehicle upon various surfaces. The device is inherently capable of preventing injury to itself and to the wheel to which it is attached.

Although but a single embodiment of the invention has been shown and described in detail with only a few modifications, it is obvious that many changes may be made in the size, shape, detail, and arrangements of the various elements of the invention within the scope of the appended claims.

I claim:

1. A device for augmenting the surface gripping characteristics of a vehicle tire comprising a C-shaped traction cleat adapted to lie across the tread of a tire and adapted to extend radially inwardly from a tire tread area partially over a tire side wall area on either side of a tire, a first dog on said cleat adjacent the outer end thereof, an anchor link having one end initially insertable in an aperture of a vehicle wheel and subsequently inextricably cocked therein and having the other end thereof pivotally connected to said cleat, and a second dog on said link adapted to engage said first dog on said cleat to prevent said cleat and said link from pivoting outwardly thereby holding the device locked on a wheel.

2. In a device as set forth in claim 1, said link being capable of inward pivoting relative to said cleat without interference by said dogs to allow the device to deform under a load which causes a tire to deform reducing the radial extent between the tire tread and the wheel aperture.

3. In a device as set forth in claim 1, said anchor link being adapted to be freely slidable inwardly of a wheel to permit pivoting of said anchor link at said cleat to permit said cleat moving radially inwardly of a wheel under loads.

4. In a device as set forth in claim 1, one of said dogs being manually disengageable with the other said dog to permit said device being mounted and dismounted relative to a tire and wheel.

5. In a device as set forth in claim 1, an inside arm on said cleat adapted to extend past the apex of a tire side wall curvature and to fit a tire snugly radially inwardly of the curvature so as to grip a tire side wall to assist in securing the device on a tire.

6. In a device as set forth in claim 1, paired cross-bars having paired ends mounted on the arms of said C-cleat and skid chains between the paired ends of said bars adapted to lie across the tread of a tire.

7. In a device as set forth in claim 1, said second dog being movably mounted on said anchor link for optionally engaging and disengaging said first dog for respectively locking said device on a wheel and for mounting and dismounting said device on and from a wheel.

8. In a device as set forth in claim 1, the device being so integrated that centrifugal force generated by the turning of a wheel tending to throw said cleat from the tire is resisted by said link directly relative to the axial outside portion of said cleat and resisted by said link via said dogs relative to the axial inside portion of said cleat.

9. In a device as set forth in claim 1, a spring biasing said second dog into engagement with said first dog.

10. In a device as set forth in claim 1, a projection on said anchor link extending sidewise outwardly of the pivotal connection between said anchor link and said cleat and an arm pivotally mounted on said projection at a point sidewise outwardly of the pivotal connection between anchor link and said cleat supporting said second dog in engageable and disengageable relation to said first dog for respectively locking said device on a wheel and for mounting and dismounting said device on and from a wheel.

11. In a device as set forth in claim 10, centrifugal force generated by the turning of a wheel tending to throw said cleat from a tire is resisted by said link directly relative to the axial outside portion of said cleat and resisted by said link via said dogs relative to the axial inside portion of said cleat.

12. A device for supplementing the surface gripping characteristics of a vehicle tire comprising a traction cleat adapted to wrap around the tread area of a tire and the tire side wall areas adjacent thereof, and adapted to grip the tire when lying adjacent thereto, an anchor link pivotally connected to the outer end of said cleat, an upturned end on said link adapted to lock in a wheel aperture when said link lies adjacent a tire and adapted to be extractable therefrom when said link is not adjacent a tire, said cleat being wrappable around said tire after said anchor link is locked by pivoting said cleat relative to said link; a first dog on said cleat adjacent said link, and a second dog on said link adjacent said cleat adapted to selectively engage and disengage said first dog to respectively prevent said cleat from removably pivoting outwardly to lock the device on a wheel and to allow said cleat pivoting outwardly to permit removal of the device from a wheel.

13. In a device as set forth in claim 12, said second dog being pivotally mounted radially inwardly of said first dog so that centrifugal force generated by revolving a wheel upon which the device is mounted tends to throw said second dog into engaging position relative to said first dog.

14. In a device as set forth in claim 12, said anchor link being freely inwardly pivotally disposed so that said anchor link can move inwardly and downwardly relative to said cleat as said cleat moves upwardly under load conditions.

15. A device for augmenting the surface gripping characteristics of a vehicle tire comprising a C-shaped traction cleat adapted to lie across the tread of a tire and adapted to extend radially inwardly from a tire tread area partially over a tire side wall area on either side of a tire, a first projection on said cleat adjacent the outer end thereof, an anchor link having one end pivotally connected to said cleat and the other end adapted to engage a wheel portion on the radial inside thereof, and a second projection on said link adapted to engage said first projection on said cleat to prevent said link and cleat from pivoting outwardly relative to one another to hold the device on a wheel; one said projection being adapted to be disengageable with the other said projection to permit mounting and dismounting the device on a wheel.

16. In a device as set forth in claim 15, said link and cleat being free to pivot inwardly relative to one another when mounted on a wheel to permit said cleat moving inwardly relative to said link when the tire tread moves radially inwardly under loads.

JOHN M. WESTRATE.

REFERENCES CITED

The following references are of record in the file of this patent:

UNITED STATES PATENTS

| Number | Name | Date |
| --- | --- | --- |
| 2,467,654 | Boje | Apr. 19, 1949 |
| 2,505,711 | Hughes | Apr. 25, 1950 |
| 2,507,090 | Brown | May 9, 1950 |